US011462176B2

(12) United States Patent
Choi et al.

(10) Patent No.: US 11,462,176 B2
(45) Date of Patent: Oct. 4, 2022

(54) MICRO OLED DISPLAY DEVICE WITH SAMPLE AND HOLD CIRCUITS TO REDUCE BONDING PADS

(71) Applicant: Meta Platforms Technologies, LLC, Menlo Park, CA (US)

(72) Inventors: Min Hyuk Choi, San Jose, CA (US); Wenhao Qiao, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/130,941

(22) Filed: Dec. 22, 2020

(65) Prior Publication Data

US 2022/0199035 A1 Jun. 23, 2022

(51) Int. Cl.

| | |
|---|---|
| ***G06F 3/00*** | (2006.01) |
| ***G09G 3/3275*** | (2016.01) |
| ***G09G 3/3225*** | (2016.01) |
| ***G09G 3/20*** | (2006.01) |

(52) U.S. Cl.

CPC ......... *G09G 3/3275* (2013.01); *G09G 3/2003* (2013.01); *G09G 3/3225* (2013.01); *G09G 2300/0842* (2013.01); *G09G 2310/0294* (2013.01); *G09G 2310/0297* (2013.01)

(58) Field of Classification Search

None

See application file for complete search history.

(56) References Cited

U.S. PATENT DOCUMENTS

| | | | | |
|---|---|---|---|---|
| 2005/0116919 | A1 | 6/2005 | Shin | |
| 2007/0296272 | A1 | 12/2007 | Yen et al. | |
| 2012/0062529 | A1 | 3/2012 | Koyama | |
| 2014/0028936 | A1* | 1/2014 | Uehara | G02F 1/1326 349/37 |
| 2016/0103349 | A1* | 4/2016 | Park | G02F 1/1309 349/96 |
| 2017/0262132 | A1* | 9/2017 | Kida | G02F 1/13338 |
| 2020/0193912 | A1* | 6/2020 | Park | G09G 3/3275 |
| 2021/0043577 | A1* | 2/2021 | Lee | H01L 23/485 |
| 2021/0201730 | A1 | 7/2021 | Gao et al. | |

FOREIGN PATENT DOCUMENTS

| | | |
|---|---|---|
| CN | 110992874 A | 4/2020 |
| GB | 2384102 A | 7/2003 |

OTHER PUBLICATIONS

International Search Report and Written Opinion for International Application No. PCT/US2021/056755, dated Jan. 27, 2022, 15 pages.

* cited by examiner

*Primary Examiner* — Michael A Faragalla
(74) *Attorney, Agent, or Firm* — Fenwick & West LLP

(57) ABSTRACT

Embodiments relate to a display device including bonding pads on a display element where data signals for a plurality of columns of pixels are provided to a same bonding pad in a time-divisional manner. Each of the bonding pads is connected to a plurality of demultiplexer circuits for sampling data signals at the bonding pad, storing the data signals, and transferring the sample data signals to corresponding columns of pixels. Each column of pixels includes a plurality of columns of subpixels, and a period during which a demultiplexer circuit samples the bonding pad for a column of subpixels of a first color may at least partially overlap with a period during which the demultiplexer circuit transfers previously sampled data signals to a column of subpixels of a second color.

18 Claims, 10 Drawing Sheets

MICRO OLED DISPLAY DEVICE WITH SAMPLE AND HOLD CIRCUITS TO REDUCE BONDING PADS

BACKGROUND

This disclosure relates to a display device, and specifically to a display device with bonding pads where each bonding pad receives data signals for multiple columns of micro organic light emitting diode (OLED) pixels.

A display device is often used in a virtual reality (VR) or augmented-reality (AR) system as a head-mounted display (HMD) or a near-eye display (NED). The display device may include an array of OLED pixels that emits light. To display a high resolution image, the display device may include a large number of OLED pixels in the array that are driven with a high frame rate. As a result of high frame rate, there may be signal settling errors that cause deterioration in image quality. Further, HMD and NED need to be portable and compact to be worn by users, so there is limited space on a chip for arranging bonding pads and signal lines for routing data signals and timing control signals for operating the pixels. To reduce area of the chip, adjacent bonding pads may be disposed with a smaller pitch in between or arranged into rows. However, these alternative layouts involve a complex process flow for manufacturing and may result in yield loss. Further, when bonding pads are placed close to each other, there may be an increase in signal noise due to crosstalk. Alternatively, a larger chip may be used to fit the large number of OLED pixels, signal lines, and bonding pads, but using a larger chip increases the cost and size of the display device.

SUMMARY

Embodiments relate to a display device including a display element with a plurality of pixels and a display driver circuit that generates data signals for the display element, where the display element includes a plurality of bonding pads each of which receives data signals for multiple columns of pixels in the display element. Since one bonding pad is used for receiving data voltages for multiple columns of pixels that each includes multiple columns of subpixels, the display element includes a demultiplexer and sample and hold circuits for providing data signals for driving the columns of pixels in a time-divisional manner. The demultiplexer routes data signals for a column of pixels to a corresponding sample and hold circuit that samples data signals at the bonding pad, stores the sampled data signal value, and sends the stored value to the column of pixels for driving the column of pixels.

In some embodiments, the display element includes a first source driver that drives a first column of pixels and a second source driver that drives a second column of pixels that are connected to the same bonding pad. Each of the first source driver and the second source driver is connected to a set of sample and hold circuits. The set of sample and hold circuits is connected in parallel between the corresponding source driver and the bonding pad, where the set of sample and hold circuits includes a plurality of capacitors that stores data signals for the corresponding column of pixels, a first set of switches that connects or disconnects the capacitors and the bonding pad to sample and store the data signal value in the capacitors, and a second set of switches that connects or disconnects the capacitors and the corresponding source driver to send the stored value to the column of pixels. At a given time, no more than one of the first set of switches may be closed at a time to charge no more than one capacitor at a time. However, a switch from the first set of switches and a switch from the second set of switches may be closed at the same time such that a period during which one capacitor is charged overlaps with a period during which another capacitor transfers data voltage to the source driver, allowing for a compact operation time of the display device.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a display device with a reduced number of bonding pads in a display element. Instead of having a bonding pad for each column of pixels, a bonding pad may be connected to a plurality of columns of pixels and send data signals to the plurality of columns of pixels in a time-divisional manner. The bonding pad is connected to the plurality of columns of pixels through a set of sample and hold circuits, and the set of sample and hold circuits samples data signals at the bonding pad, stores the sampled data signal value, and sends the stored value to the appropriate column of pixels.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Near-Eye Display

Figure 1:
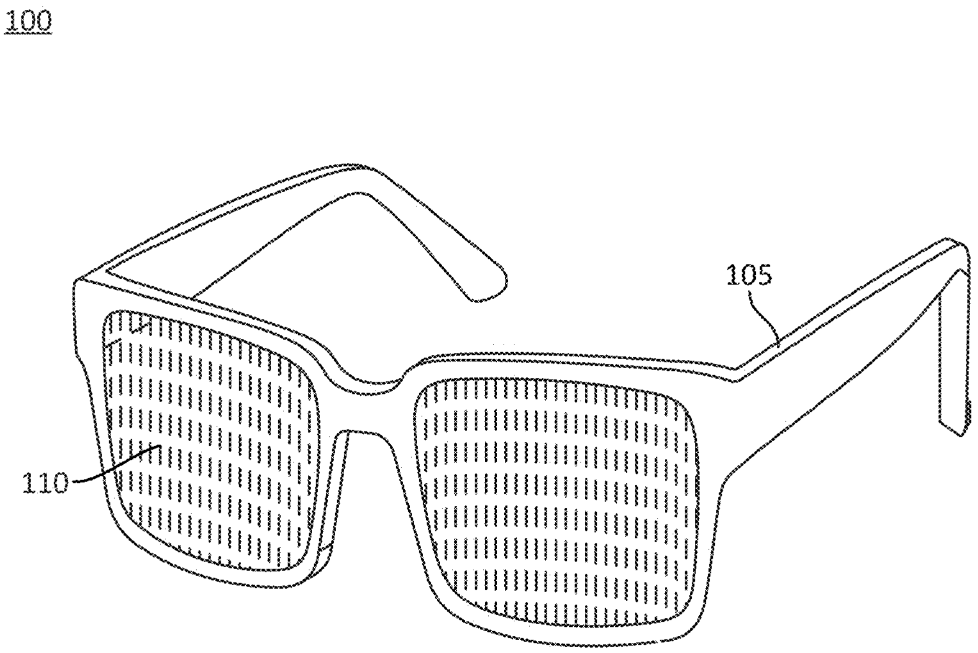
FIG. 1 is a diagram of a head-mounted display (HMD) that includes a near-eye display (NED), according to some embodiments.

FIG. 1 is a diagram of a near-eye-display (NED) 100, in accordance with some embodiments. The NED 100 may present media to a user. Examples of media that may be presented by the NED 100 include one or more images, video, audio, or some combination thereof. In some embodiments, audio may be presented via an external device (e.g., speakers and/or headphones) that receives audio information from the NED 100, a console (not shown), or both, and presents audio data to the user based on the audio information. The NED 100 is generally configured to operate as a virtual reality (VR) NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., still images, video, sound, etc.).

The NED 100 shown in FIG. 1 may include a frame 105 and a display 110. The frame 105 may include one or more optical elements that together display media to a user. That is, the display 110 may be configured for a user to view the content presented by the NED 100. As discussed below in conjunction with FIG. 2, the display 110 may include at least one source assembly to generate image light to present optical media to an eye of the user. The source assembly may include, e.g., a source, an optics system, or some combination thereof.

FIG. 1 is merely an example of a virtual reality system, and the display systems described herein may be incorporated into further such systems. In some embodiments, FIG. 1 may also be referred to as a Head-Mounted-Display (HMD).

Figure 2:
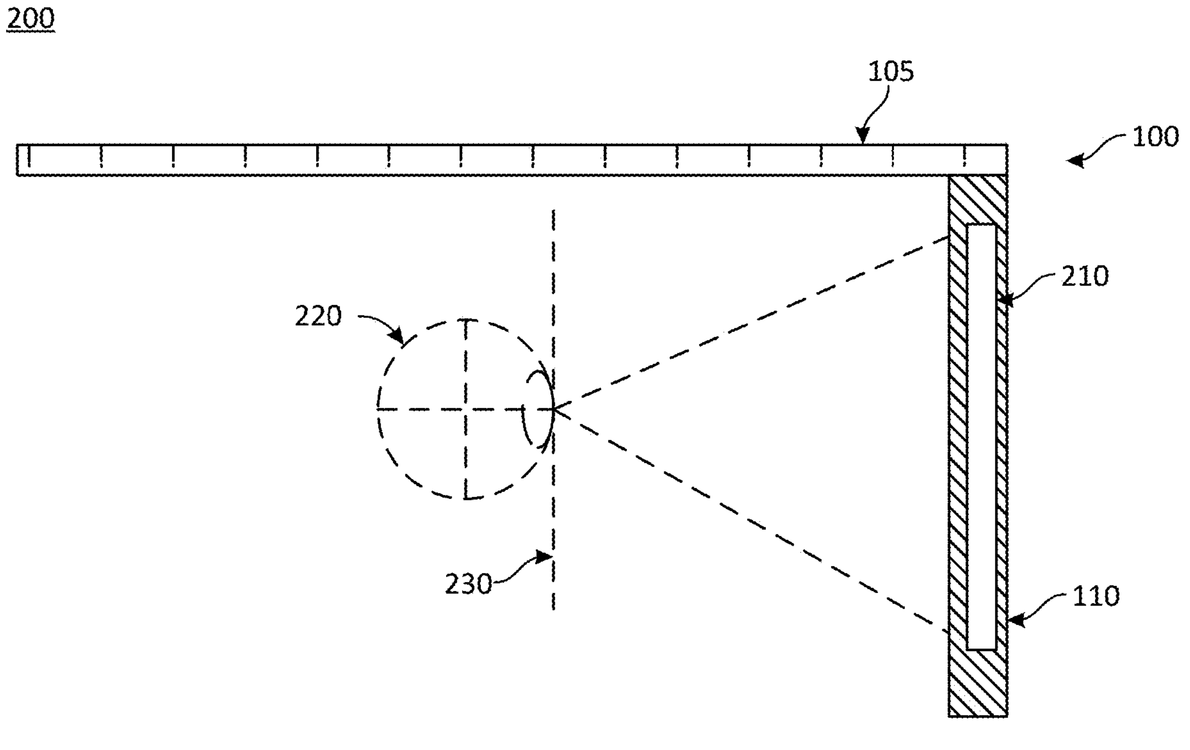
FIG. 2 is a cross-sectional view of the HMD illustrated in FIG. 1, according to some embodiments.

FIG. 2 is a cross section 200 of the NED 100 illustrated in FIG. 1, in accordance with some embodiments of the present disclosure. The cross section 200 may include at least one display assembly 210, and an exit pupil 230. The exit pupil 230 is a location where the eye 220 may be positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly that is separate from or integrated with the display assembly 210 shown in FIG. 2, may provide image light to another eye of the user.

The display assembly 210 may direct the image light to the eye 220 through the exit pupil 230. The display assembly 210 may be composed of one or more materials (e.g., plastic, glass, etc.) with one or more refractive indices that effectively decrease the weight and widen a field of view of the NED 100.

In alternate configurations, the NED 100 may include one or more optical elements (not shown) between the display assembly 210 and the eye 220. The optical elements may act to, by way of various examples, correct aberrations in image light emitted from the display assembly 210, magnify image light emitted from the display assembly 210, perform some other optical adjustment of image light emitted from the display assembly 210, or combinations thereof. Example optical elements may include an aperture, a Fresnel lens, a convex lens, a concave lens, a filter, or any other suitable optical element that may affect image light.

In some embodiments, the display assembly 210 may include a source assembly to generate image light to present media to a user's eyes. The source assembly may include, e.g., a light source, an optics system, or some combination thereof. In accordance with various embodiments, a source assembly may include a light-emitting diode (LED) such as an organic light-emitting diode (OLED).

Figure 3:
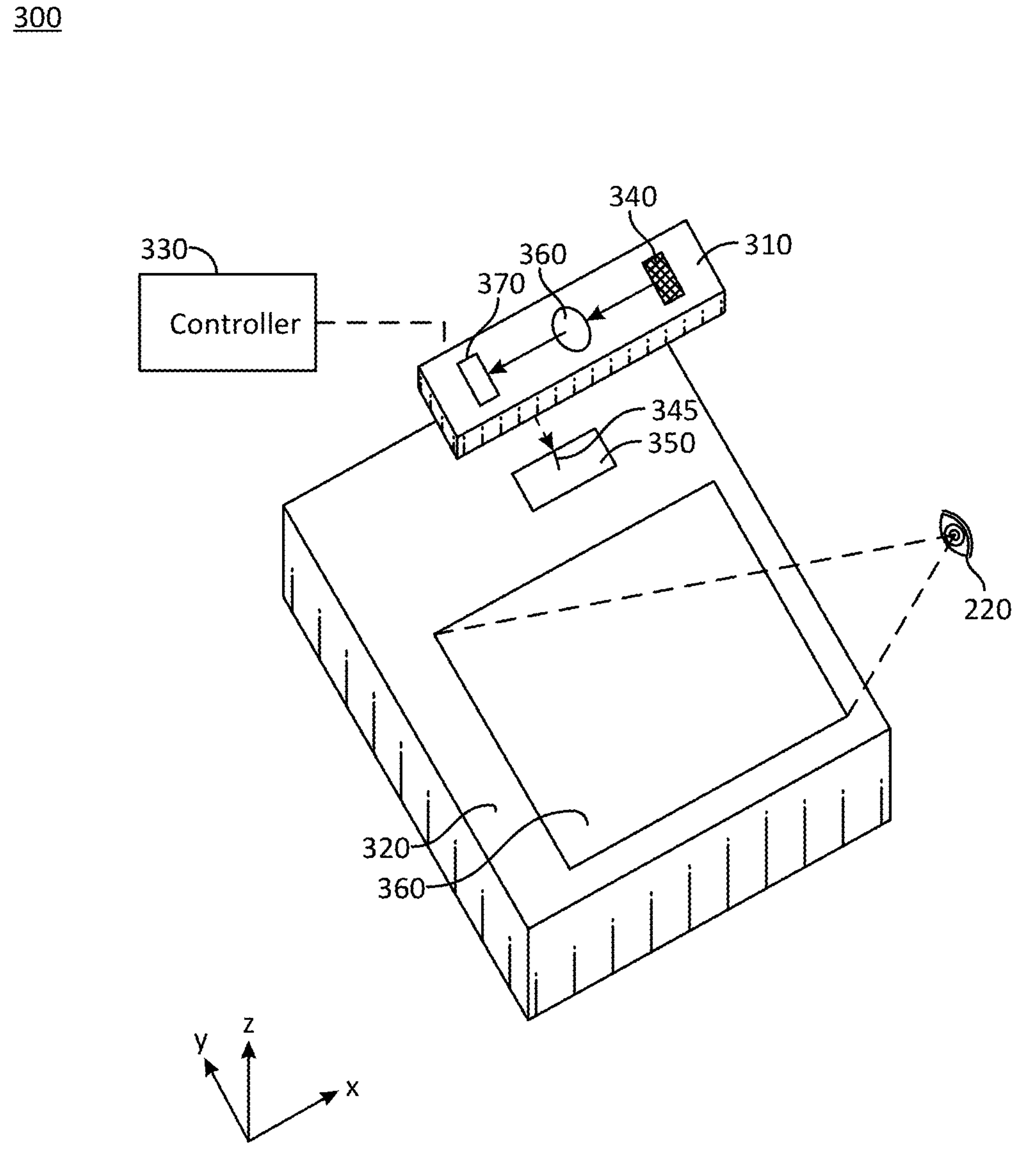
FIG. 3 illustrates a perspective view of a waveguide display, according to some embodiments.

FIG. 3 illustrates a perspective view of a waveguide display 300 in accordance with some embodiments. The waveguide display 300 may be a component (e.g., display assembly 210) of NED 100. In alternate embodiments, the waveguide display 300 may constitute a part of some other NED, or other system that directs display image light to a particular location.

The waveguide display 300 may include, among other components, a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300 may provide image light to another eye of the user. In a partially separate system, for instance, one or more components may be shared between waveguide displays for each eye.

The source assembly 310 generates image light. The source assembly 310 may include a source 340, a light conditioning assembly 360, and a scanning mirror assembly 370. The source assembly 310 may generate and output image light 345 to a coupling element 350 of the output waveguide 320.

The source 340 may include a source of light that generates at least a coherent or partially coherent image light 345. The source 340 may emit light in accordance with one or more illumination parameters received from the controller 330. The source 340 may include one or more source elements, including, but not restricted to light emitting diodes, such as micro-OLEDs, as described in detail below with reference to FIGS. 4-10.

The output waveguide 320 may be configured as an optical waveguide that outputs image light to an eye 220 of a user. The output waveguide 320 receives the image light 345 through one or more coupling elements 350 and guides the received input image light 345 to one or more decoupling elements 360. In some embodiments, the coupling element 350 couples the image light 345 from the source assembly 310 into the output waveguide 320. The coupling element 350 may be or include a diffraction grating, a holographic grating, some other element that couples the image light 345 into the output waveguide 320, or some combination thereof. For example, in embodiments where the coupling element 350 is a diffraction grating, the pitch of the diffraction grating may be chosen such that total internal reflection occurs, and the image light 345 propagates internally toward the decoupling element 360. For example, the pitch of the diffraction grating may be in the range of approximately 300 nm to approximately 600 nm.

The decoupling element 360 decouples the total internally reflected image light from the output waveguide 320. The decoupling element 360 may be or include a diffraction grating, a holographic grating, some other element that decouples image light out of the output waveguide 320, or some combination thereof. For example, in embodiments where the decoupling element 360 is a diffraction grating, the pitch of the diffraction grating may be chosen to cause incident image light to exit the output waveguide 320. An orientation and position of the image light exiting from the output waveguide 320 may be controlled by changing an orientation and position of the image light 345 entering the coupling element 350.

The output waveguide 320 may be composed of one or more materials that facilitate total internal reflection of the image light 345. The output waveguide 320 may be composed of, for example, silicon, glass, or a polymer, or some combination thereof. The output waveguide 320 may have a relatively small form factor such as for use in a head-mounted display. For example, the output waveguide 320 may be approximately 30 mm wide along an x-dimension, 50 mm long along a y-dimension, and 0.5-1 mm thick along a z-dimension. In some embodiments, the output waveguide 320 may be a planar (2D) optical waveguide.

The controller 330 may be used to control the scanning operations of the source assembly 310. In certain embodiments, the controller 330 may determine scanning instructions for the source assembly 310 based at least on one or more display instructions. Display instructions may include instructions to render one or more images. In some embodiments, display instructions may include an image file (e.g., bitmap). The display instructions may be received from, e.g., a console of a virtual reality system (not shown). Scanning instructions may include instructions used by the source assembly 310 to generate image light 345. The scanning instructions may include, e.g., a type of a source of image light (e.g. monochromatic, polychromatic), a scanning rate, an orientation of scanning mirror assembly 370, and/or one or more illumination parameters, etc. The controller 330 may include a combination of hardware, software, and/or firmware not shown here so as not to obscure other aspects of the disclosure.

According to some embodiments, source 340 may include a light emitting diode (LED), such as an organic light emitting diode (OLED). An organic light-emitting diode (OLED) is a light-emitting diode (LED) having an emissive electroluminescent layer that may include a thin film of an organic compound that emits light in response to an electric current. The organic layer is typically situated between a pair of conductive electrodes. One or both of the electrodes may be transparent.

As will be appreciated, an OLED display can be driven with a passive-matrix (PMOLED) or active-matrix (AMOLED) control scheme. In a PMOLED scheme, each row (and line) in the display may be controlled sequentially, whereas AMOLED control typically uses a thin-film transistor backplane to directly access and switch each individual pixel on or off, which allows for higher resolution and larger display areas.

Figure 4:
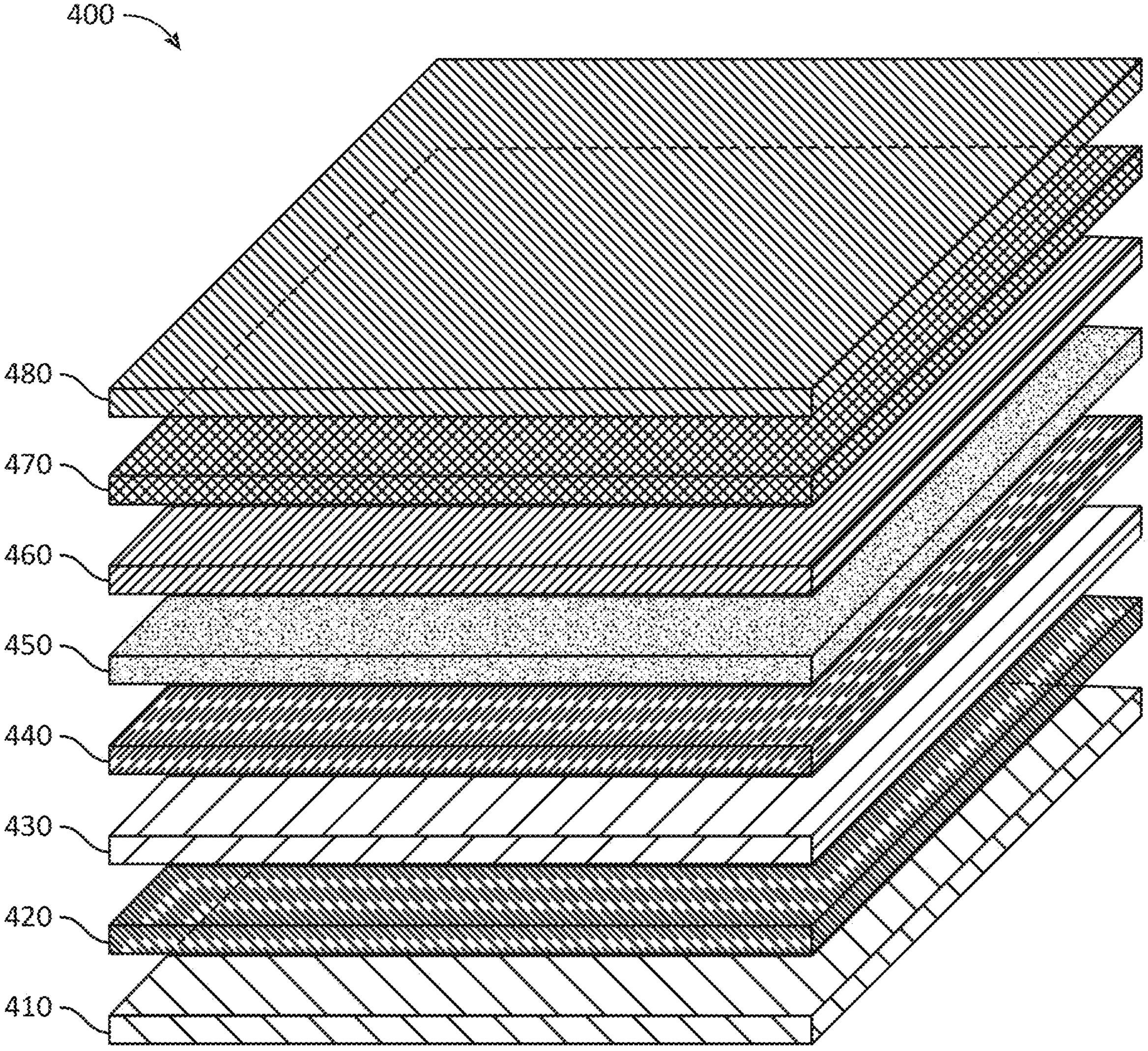
FIG. 4 depicts a simplified OLED structure, according to some embodiments.

FIG. 4 depicts a simplified OLED structure according to some embodiments. As shown in an exploded view, OLED 400 may include, from bottom to top, a substrate 410, anode 420, hole injection layer 430, hole transport layer 440, emissive layer 450, blocking layer 460, electron transport layer 470, and cathode 480. In some embodiments, substrate (or backplane) 410 may include single crystal or polycrystalline silicon or other suitable semiconductor (e.g., germanium).

Anode 420 and cathode 480 may include any suitable conductive material(s), such as transparent conductive oxides (TCOs, e.g., indium tin oxide (ITO), zinc oxide (ZnO), and the like). The anode 420 and cathode 480 are configured to inject holes and electrons, respectively, into one or more organic layer(s) within emissive layer 450 during operation of the device.

The hole injection layer 430, which is disposed over the anode 420, receives holes from the anode 420 and is configured to inject the holes deeper into the device, while the adjacent hole transport layer 440 may support the transport of holes to the emissive layer 450. The emissive layer 450 converts electrical energy to light. Emissive layer 450 may include one or more organic molecules, or light-emitting fluorescent dyes or dopants, which may be dispersed in a suitable matrix as known to those skilled in the art.

Blocking layer 460 may improve device function by confining electrons (charge carriers) to the emissive layer 450. Electron transport layer 470 may support the transport of electrons from the cathode 480 to the emissive layer 450.

In some embodiments, the generation of red, green, and blue light (to render full-color images) may include the formation of red, green, and blue OLED sub-pixels in each pixel of the display. Alternatively, the OLED 400 may be adapted to produce white light in each pixel. The white light may be passed through a color filter to produce red, green, and blue sub-pixels.

Any suitable deposition process(es) may be used to form OLED 400. For example, one or more of the layers constituting the OLED may be fabricated using physical vapor deposition (PVD), chemical vapor deposition (CVD), evaporation, spray-coating, spin-coating, atomic layer deposition (ALD), and the like. In further aspects, OLED 400 may be manufactured using a thermal evaporator, a sputtering system, printing, stamping, etc.

According to some embodiments, OLED 400 may be a micro-OLED. A "micro-OLED," in accordance with various examples, may refer to a particular type of OLED having a small active light emitting area (e.g., less than 2,000 μm2 in some embodiments, less than 20 μm2 or less than 10 μm2 in other embodiments). In some embodiments, the emissive surface of the micro-OLED may have a diameter of less than approximately 2 μm. Such a micro-OLED may also have collimated light output, which may increase the brightness level of light emitted from the small active light emitting area.

Figure 5:
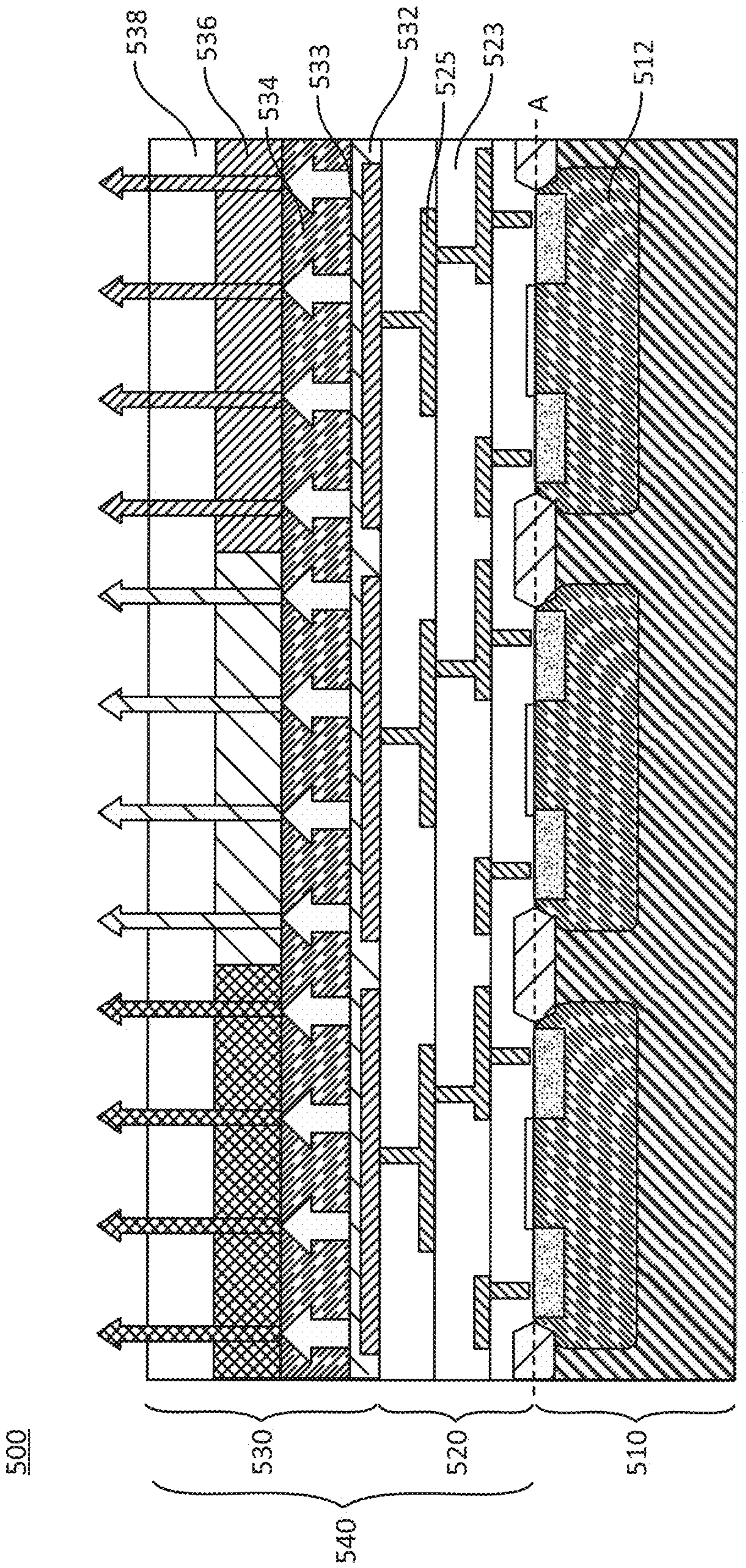
FIG. 5 is a schematic view of an OLED display device architecture including a display driver integrated circuit (DDIC), according to some embodiments.

FIG. 5 is a schematic view of an OLED display device architecture including a display driver integrated circuit (DDIC) 510 according to some embodiments. According to some embodiments, OLED display device 500 (e.g., micro-OLED chip) may include a display active area 530 having an active matrix 532 (such as OLED 400) disposed over a single crystal (e.g., silicon) backplane 520. The combined display/backplane architecture, i.e., display element 540 may be bonded (e.g., at or about interface A) directly or indirectly to the DDIC 510. As illustrated in FIG. 5, DDIC 510 may include an array of driving transistors 512, which may be formed using conventional CMOS processing. One or more display driver integrated circuits may be formed over a single crystal (e.g., silicon) substrate.

In some embodiments, the display active area 530 may have at least one areal dimension (i.e., length or width) greater than approximately 1.3 inches, e.g., approximately 1.4, 1.5, 1.6, 1.7, 1.8, 1.9, 2.0, 2.25, 2.5, 2.75, or 3 inches, including ranges between any of the foregoing values, although larger area displays are contemplated.

Backplane 520 may include a single crystal or polycrystalline silicon layer 523 having a through silicon via 525 for electrically connecting the DDIC 510 with the display active area 530. In some embodiments, display active area 530 may further include a transparent encapsulation layer 534 disposed over an upper emissive surface 533 of active matrix 532, a color filter 536, and cover glass 538.

According to various embodiments, the display active area 530 and underlying backplane 520 may be manufactured separately from, and then later bonded to, DDIC 510, which may simplify formation of the OLED active area, including formation of the active matrix 532, color filter 536, etc.

The DDIC 510 may be directly bonded to a back face of the backplane opposite to active matrix 532. In further embodiments, a chip-on-flex (COF) packaging technology may be used to integrate display element 540 with DDIC 510, optionally via a data selector (i.e., multiplexer) array (not shown) to form OLED display device 500. As used herein, the terms "multiplexer" or "data selector" may, in some examples, refer to a device adapted to combine or select from among plural analog or digital input signals, which are transmitted to a single output. Multiplexers may be used to increase the amount of data that can be communicated within a certain amount of space, time, and bandwidth.

As used herein, "chip-on-flex" (COF) may, in some examples, refer to an assembly technology where a microchip or die, such as an OLED chip, is directly mounted on and electrically connected to a flexible circuit, such as a direct driver circuit. In a COF assembly, the microchip may avoid some of the traditional assembly steps used for individual IC packaging. This may simplify the overall processes of design and manufacture while improving performance and yield.

In accordance with certain embodiments, assembly of the COF may include attaching a die to a flexible substrate, electrically connecting the chip to the flex circuit, and encapsulating the chip and wires, e.g., using an epoxy resin to provide environmental protection. In some embodiments, the adhesive (not shown) used to bond the chip to the flex substrate may be thermally conductive or thermally insulating. In some embodiments, ultrasonic or thermosonic wire bonding techniques may be used to electrically connect the chip to the flex substrate.

Figure 6:
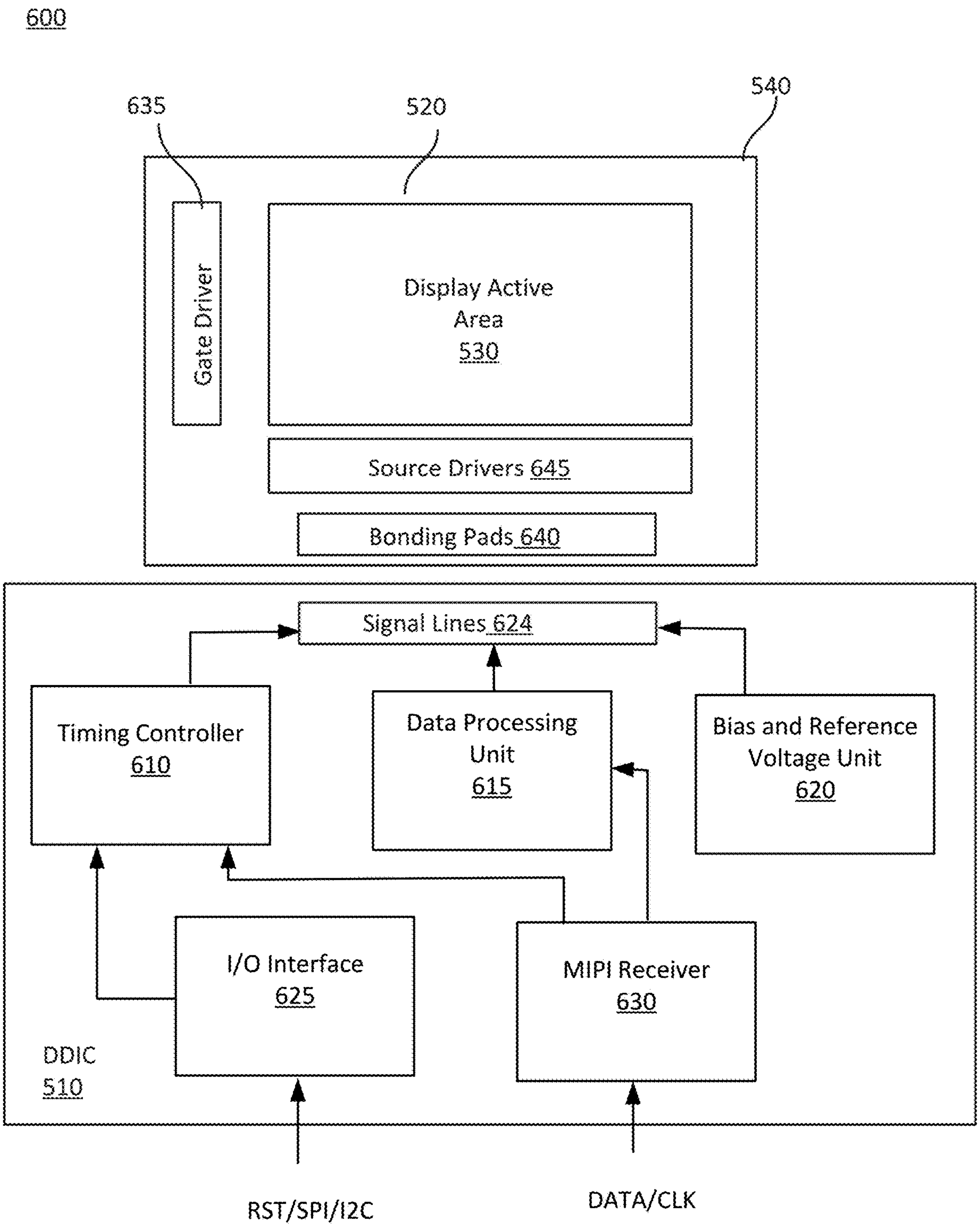
FIG. 6 is a schematic view of an OLED display device, according to some embodiments.

FIG. 6 is a schematic view of an OLED display device 600 according to some embodiments. The OLED display device 600 may include, among other components, the DDIC 510 and the display element 540. The display element 540 may be an integrated circuit including the backplane 520, the display active area 530, source drivers 645, a gate driver 635, and bonding pads 640.

The display active area 530 may include a plurality of pixels (e.g., m rows by n columns) with each pixel including a plurality of subpixels (e.g., a red subpixel, a green subpixel, a blue subpixel). Each subpixel may be connected to a gate line and a data line and driven to emit light according to a data signal received through the connected data line when a corresponding gate signal is provided through the connected gate line. Each row of pixels may be connected to an emission line that controls when the row of pixels is to emit light by sending emission line control signal to the row.

The backplane 520 may include conductive traces for electrically connecting the pixels in the display active area 530, the gate driver 635, the source drivers 645, and the bonding pads 640. The bonding pads 640 are conductive regions on the backplane 520 that are electrically coupled to signal lines 624 of the DDIC 510 to receive timing control signals from the timing controller 610, data signals from the data processing unit 615, and bias and reference voltages from the bias and reference voltage unit 620. The bonding pads 640 are connected to the source drivers 645 and the gate driver 635 as well as other circuit elements in the backplane 520. In the embodiment illustrated in FIG. 6, the DDIC 510 generates data signals and timing control signals and transmits the signals to the bonding pads 640 of the display element 540. However, in other embodiments, the timing controller 610 and/or the data processing unit 615 may be in the display element 540 instead of the DDIC 510. When the timing controller 610 and/or the data processing unit 615 are on the display element 540, there may be fewer bonding pads 640 since the data signals and timing control signals may be directly transmitted to the corresponding component without a bonding pad 640.

The gate driver 635 may be connected to a plurality of gate lines (GL1 to GLm) and provide gate-on signals to the plurality of gate lines at appropriate times. In some embodiments, each subpixel in the display active area 530 may be connected to a gate line. For a given subpixel, when the subpixel receives a gate-on signal via the corresponding gate line, the subpixel can receive a data signal to emit light.

The source drivers 645 provide data signals to the display active area 530. Each of the source drivers 645 is connected to a column of pixels which includes a plurality of columns of subpixels. For example, each source driver 645 is connected to a column of red subpixels, a column of green subpixels, and a column of blue subpixels. A source driver 645 may be connected to a demultiplexer (demux) that receives an input from the source driver 645 and outputs data signals to an appropriate column of subpixels. The demux may be a 1:3 demux that outputs to the column of red subpixels, the column of green subpixels, or the column of blue subpixels in a time-divisional manner.

The DDIC 510 may include a timing controller 610, a data processing circuit 615, a bias and reference voltage unit 620, an input/output (I/O) interface 625, a mobile industry processor interface (MIPI) receiver 630, and signal lines 624. In other embodiments, one or more components of the DDIC 510 may be disposed in the display element 540.

The I/O interface 625 is a circuit that receives control signals from other sources and sends operation signals to the timing controller 610. The control signals may include a reset signal RST to reset the display element 540 and signals according to serial peripheral interface (SPI) or inter-integrated circuit (I2C) protocols for digital data transfer. Based on the received control signals, the I/O interface 625 may process commands from a system on a chip (SoC), a central processing unit (CPU), or other system control chip.

The MIPI receiver 630 may be a MIPI display serial interface (DSI), which may include a high-speed packet-based interface for delivering video data to the pixels in the display active area 530. The MIPI receiver 630 may receive image data DATA and clock signals CLK and provide timing control signals to the timing controller 610 and image data DATA to the data processing unit 615.

The timing controller 610 may be configured to generate timing control signals for the gate driver 635, the source drivers 645, and other components in the backplane 520. The timing control signals may include a clock, a vertical synchronization signal, a horizontal synchronization signal, and a start pulse. However, timing control signals provided from the timing controller 610 according to embodiments of the present disclosure are not limited thereto.

The data processing unit 615 may be configured to receive image data DATA from the MIPI receiver 630 and convert the data format of the image data DATA to generate data signals input to the source drivers 645 for displaying images in the display active area 530.

The bias and reference voltage unit 620 provides a bias voltage Vbias and a reference voltage Vref to circuit elements to the bonding pads 640 in the display element 540.

Figure 7:
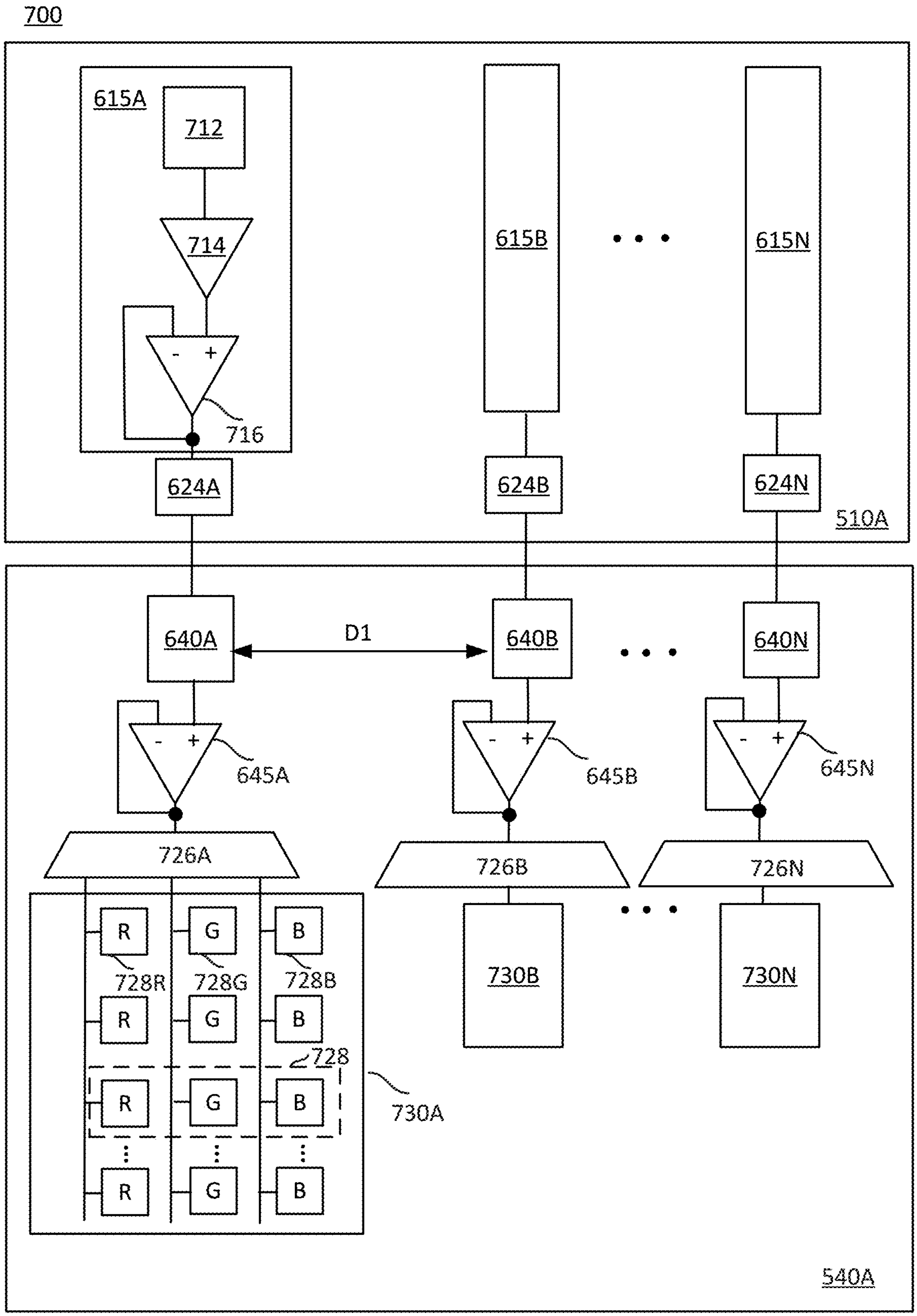
FIG. 7 is a circuit diagram of an OLED display device, according to related art.

FIG. 7 is a circuit diagram of an OLED display device 700 according to related art, which includes DDIC 510A and a display element 540A. The DDIC 510A includes a plurality of data processing units 615A through 615N (collectively referred to as "data processing units 615" and also referred to individually as "data processing unit 615" hereinafter) that receives image data DATA and converts the image data DATA into analog data signals to be transmitted to the display element 540A via the signal lines 624A through 624N (collectively referred to as "signal lines 624 and also referred to individually as "signal line 624") to cause pixels 728 arranged into columns of pixels 730A through 730N to emit light. Each pixel 728 is made up of a red subpixel 728R, a green subpixel 728G, and a blue subpixel 728B. Each data processing unit 615 includes a shift register 712, a digital to analog converter (DAC) 714, and an operational amplifier 716. The data processing unit 615 outputs analog data signals to corresponding bonding pad 640 of the display element 540A via the signal line 624. The bonding pad 640 may be connected to a source driver 645 that provides the data signals to a column of pixels 730 including a column of red subpixels 728R, a column of green subpixels 728G, and a column of blue subpixel 728B. source driver 645 is connected to a first demultiplexer 726 that receives data signals as input and outputs the data signals to a corresponding column of subpixels. The display element 540A includes a bonding pad 640 for every column of pixels 730 such that there is a first distance D1 in between adjacent bonding pads 640.

When the first distance D1 between two adjacent bonding pads 640 is small, there can be signal noise due to crosstalk that causes degraded image quality. A possible solution to increase the first distance D1 is to arrange the bonding pads into two rows such that adjacent bonding pads 640 are offset. However, this involves a complex layout and a larger surface area for the display element 540A, which increases manufacturing costs and size of the display device 600. Another possible solution is to reduce a number of bonding pads 640 by connecting multiple source drivers to a single bonding pad 640 and driving pixels using time division. This approach is described below with respect to FIG. 8.

Figure 8:
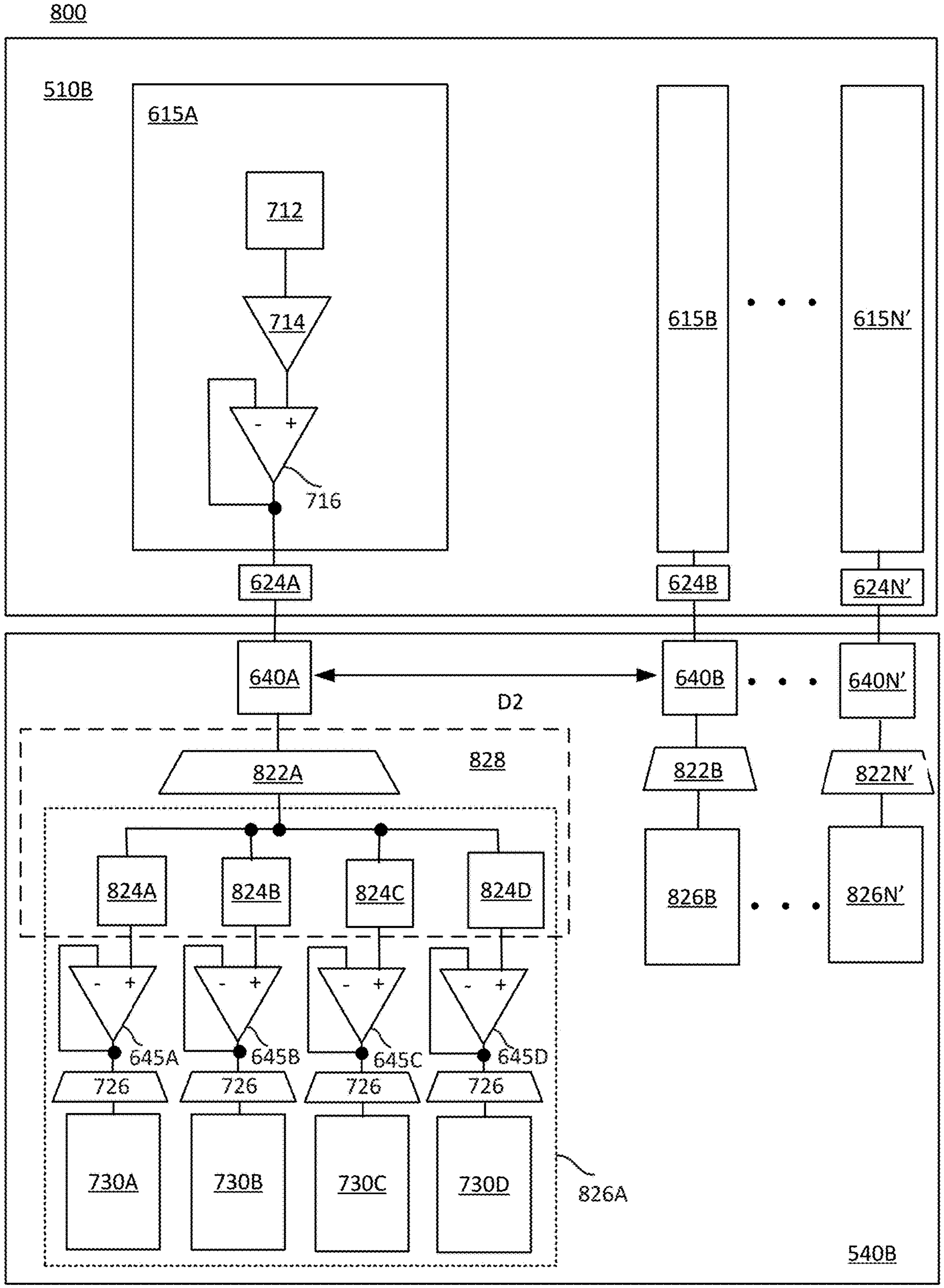
FIG. 8 is a circuit diagram of an OLED display device, according to some embodiments.

FIG. 8 is a circuit diagram of an OLED display device 800 according to some embodiments. Compared to the display device 700 of FIG. 7 that includes a bonding pad 640 for each column of pixels 730, the OLED display device 800 of FIG. 8 includes a bonding pad 640 for every four columns of pixels 730. As a result, there are fewer bonding pads 640A through 640N' in the display element 540B of FIG. 8 compared to bonding pads 640A through 640N in the display element 540A of FIG. 7, where adjacent bonding pads 640 in the display element 650B are separated by a second distance D2 greater than the first distance D1. Although the example shown in the circuit diagram 800 has a bonding pad 640 for every four columns of pixels 730, in other embodiments, fewer or additional columns of pixels 730 may be connected to a single bonding pad 640.

As illustrated in FIG. 8, each bonding pad 640 may be connected to one data processing unit 615 that provides data signals for multiple source drivers 645 that drive a plurality of columns of pixels. However, in other embodiments, a bonding pad 640 may be connected to a plurality of data processing units 615. For example, to reduce the data processing speed of the DDIC 510B, a bonding pad 640A connected to four source drivers 645A, 645B, 645C, 645D may be connected to four data processing units 615 that each corresponds to a different source driver. When there are multiple data processing units 615 that provide data signals to the same bonding pad 640, a multiplexer (e.g., 4:1 multiplexer) receive inputs from the multiple data processing units 615 and output data signals from one of the data processing units 615 to the bonding pad 640A at a time.

The bonding pad 640 of the display element 540B receives data signals from the DDIC 510B via the signal line 624. The bonding pad 640 is connected to a second demultiplexer 822 that is connected to a plurality of sample and hold circuits 824. A demultiplexer circuit 828 includes a second demultiplexer 822 and a plurality of sample and hold circuits 824A through 824D (collectively referred to as "sample and hold circuits 824" and also referred to individually as "sample and hold circuit 824") connected to the second demultiplexer 822. Each sample and hold circuit 824 corresponds to a different column of pixels 730. An example demultiplexer circuit 828 that corresponds to four columns of pixels 730A, 730B, 730C, and 730D is illustrated in detail in FIG. 9.

Figure 9:
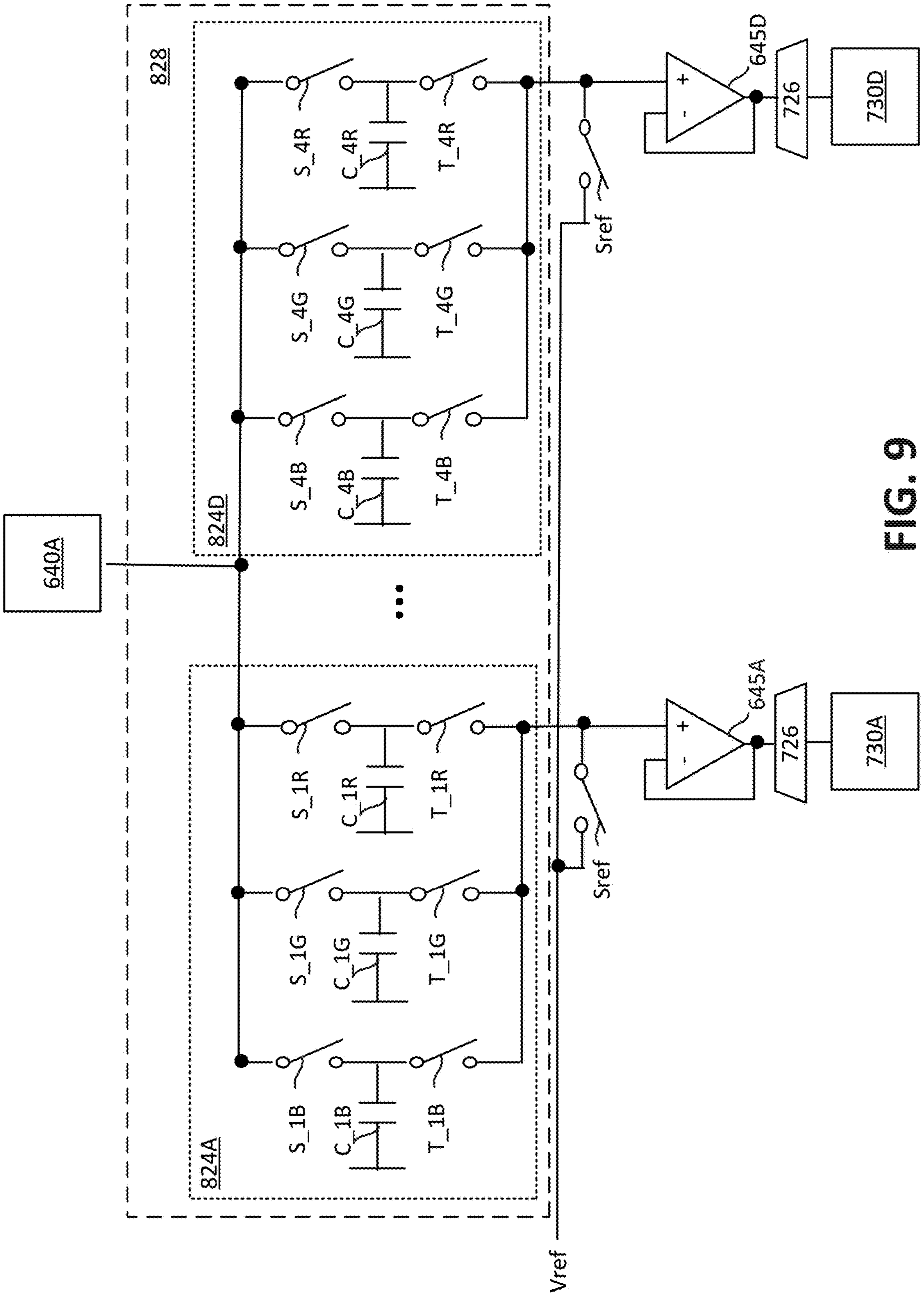
FIG. 9 is a circuit diagram of a demultiplexer circuit including sample and hold circuits, according to some embodiments.

FIG. 9 is a circuit diagram of a demultiplexer circuit including sample and hold circuits 824A, 824B, 824C, 824D according to some embodiments. In FIG. 9, functionalities of the second multiplexer 822A are implemented using timing control of the plurality of switches in the demultiplexer circuit 828, but may be implemented differently in other embodiments. The demultiplexer circuit 828 is implemented using a plurality of sample and hold circuits 824A, 824B, 824C, 824D connected in parallel, each sample and hold circuit corresponding to one of a plurality of source drivers 645A, 645B, 645C, 645D. Each of the plurality of source drivers provides data signal to a column of pixels 730A, 730B, 730C, 730D.

For example, a first sample and hold circuit 824A is connected in between a first source driver 645A and the bonding pad 640A to sample and store data signals at the bonding pad 640A. The sampled data signal is used for driving a first column of pixel 730A including a column of red subpixels 728R, a column of green subpixels 728G, and a column of blue subpixels 728B. The first sample and hold circuit 824A includes a first red sampling switch S_1R connected to a first red capacitor C_1R. The first red capacitor C_1R is configured to store data signals for the column of red subpixels 728R of the first column of pixels 730A. The first red sampling switch S_1R connects the first red capacitor C_1R to sample data signal transmitted to the bonding pad 640A by the DDIC 510B and disconnects the first red capacitor C_1R after it has been charged. The first red capacitor C_1R is also connected to a first red transfer switch T_1R that connects the first red capacitor C_1R to the first source driver 645A to transfer the data signal stored in the first red capacitor C_1R to the first source driver 645A and disconnects after completing the data signal transfer.

The first sample and hold circuit 824A also includes a first green capacitor C_1G and a first blue capacitor C_1B that are connected or disconnected from the bonding pad 640A by a first green sampling switch S_1G and a first blue sampling switch S_1B, respectively. The first green sampling switch S_1G and the first blue sampling switch S_1B sample and store data signals for its corresponding column of subpixels. After being charged, the first green capacitor C_1G and the first blue capacitor C_1B are connected or disconnected from the first source driver 645A by a first green transfer switch T_1G and a first blue transfer switch T_1B, respectively, to transfer data signal to the first source driver 645A.

The first red transfer switch T_1R, the first green transfer switch T_1G, and the first blue transfer switch T_1B are connected to an input of the first source driver 645A. The input of the first source driver 645A is also connected to a reference switch Sref that connects or disconnects the first source driver from a reference voltage Vref. The reference switch Sref prevents the input from floating by closing at times when none of the transfer switches T_1R, T_1G, T_1B are connected to the first driver 645A and fixes the input to the reference voltage Vref. Floating input could lead to deteriorated image quality, but by applying the reference voltage Vref, unexpected variations in image may be prevented.

Figure 10:
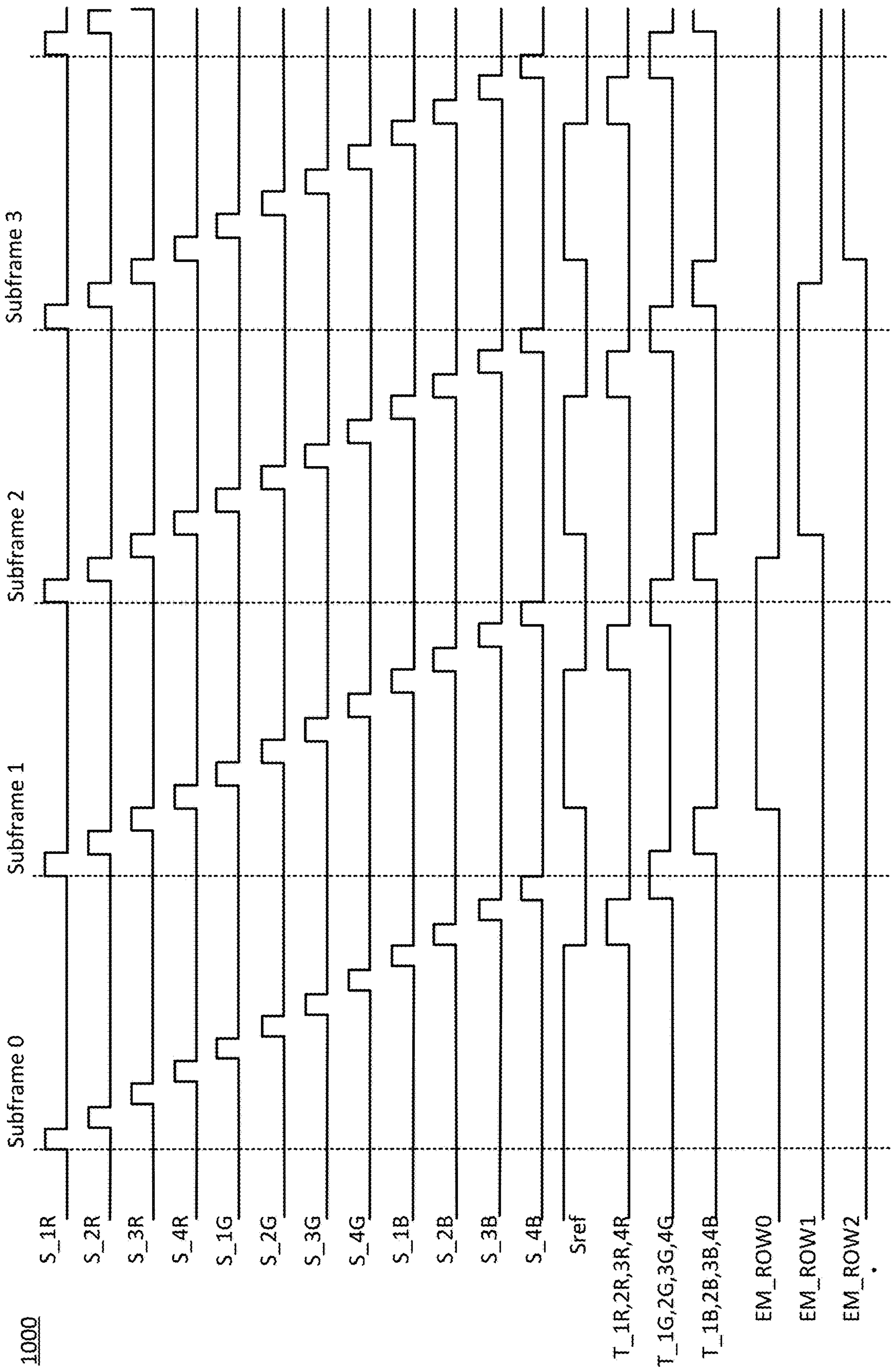
FIG. 10 is a timing diagram illustrating operation of an OLED display device, according to some embodiments.

FIG. 10 is a timing diagram illustrating an operation of an OLED display device according to some embodiments. The timing diagram 1000 illustrates how to operate a demultiplexer circuit 828. In each demultiplexer circuit 828, there are four red sampling switches S_1R, S_2R, S_3R, S_4R, four green sampling switches S_1G, S_2G, S_3G, S_4G, and four blue sampling switches S_1B, S_2B, S_3B, S_4B connected to a bonding pad 640. Because one bonding pad 640 are used to charge twelve capacitors C_1R, C_1G, C_1B, C_2R, C_2G, C_2B, C_3R, C_3G, C_3B, C_4R, C_4G, C_4B, the sampling switches are used in a time-divisional manner to charge one capacitor at a time with a corresponding data signal. During a frame period which represents a total duration of time for loading data signals and displaying a frame of image on the display active area 530, there are a plurality of subframes that each corresponds to a duration of time for sampling and charging the capacitors in the demultiplexer circuit 828 with data signals corresponding to a row of pixels. If the display active area 530 includes m rows and n columns of pixels, there are at least m subframes in a frame period.

During a subframe, the sampling switches are sequentially opened and closed to charge the capacitors with no more than one sampling switch closed at a time. A switch is closed when its timing signal is in high state and open when its timing signal is in low state. In the embodiment illustrated in the timing diagram 1000, the four red sampling switches S_1R, S_2R, S_3R, S_4R are sequentially closed and then opened to charge its corresponding capacitor, followed by the four green sampling switches S_1G, S_2G, S_3G, S_4G, and then the four blue sampling switches S_1B, S_2B, S_3B, S_4B.

After the four red capacitors C_1R, C_2R, C_3R, C_4R have been charged, the four red transfer switches T_1R, T_2R, T_3R, T_4R may be closed to transfer the data signals to the source driver 645A. As shown in FIG. 10, the four red transfer switches T_1R, T_2R, T_3R, T_4R may be closed while one or more sampling switches for different colored subpixels are closed. For example, a period during which the control signal for T_1R, 2R, 3R, 4R is in a high state overlaps with a period during which the second and third blue sampling switches S_2B, S_3B are in a high state such that the data signals for red subpixels 728R are transferred to the source drivers 645 for driving the red subpixels 728R while the second and third blue capacitors C_2B, C_3B are being charged. By overlapping sampling time with data transfer time, row speed of the OLED display device 600 may be improved and the OLED display device 600 may display high resolution images. Similarly, the four green transfer switches T_1G, T_2G, T_3G, T_4G may be closed while the fourth blue sampling switch S_4B is closed and the first red sampling switch S_1R are closed. Likewise, the four blue transfer switches T_1B, T_2B, T_3B, T_4B may be closed while the second red sampling switch S_2R and the third red sampling switch S_3R are closed. That is, a sampling switch and a transfer switch corresponding to a same color cannot be closed simultaneously, but a sampling switch and a transfer switch corresponding to different colors may be closed simultaneously. In other embodiments, overlapping periods for the sampling time and driving time may vary.

The timing signal for the reference switch Sref is the inverse of the respective transfer switches that it is connected to. For example, for the reference switch Sref connected to the first sample and hold circuit 824A, control signal for the reference switch Sref is in a high state when none of the control signals for the first red transfer switch T_1R, the first green transfer switch T_1G, and the first blue transfer switch T_1B are in a high state. Therefore, the input to the first source driver 645A is set to the reference voltage Vref only when the input is not connected to one of the first red capacitor C_1R, the first green capacitor C_1G, and the first blue capacitor C_1B.

The first red capacitor C_1R, the first green capacitor C_1G, and the first blue capacitor C_1B are connected to the same first source driver 645A. The first source driver 645A outputs data signals to one of the three columns of subpixels within the first column 730A at a time. Each subpixel may be connected to a gate line and a data line and driven by according to a data signal provided to the connected data line in response to a gate signal provided through the connected gate line. Each subpixel may include a storage capacitor that stores charge according to the data signal provided by the first source driver 645A until the subpixel is configured to emit light.

Each row of pixels 728 in the display active area 530 may be connected to an emission line configured to receive an emission line control signal (e.g., EM_ROW0, EM_ROW1, . . . EM_ROWN−1) that corresponding to the row. When the emission line control signal is in a high state, pixels 728 in the row emits light. Accordingly, the emission period for a row of pixels occurs after all of the transferring switches complete transferring the charge in the capacitors of the sample and hold circuit 828 to the subpixels in the row. For example, referring to row 0 of the display active area 530, the sample and hold circuit 828 samples data signals for the pixels 728 in row 0 during subframe 0 and transfers the data signals to the pixels 728 in row 0 during a portion of subframe 0 and subframe 1. After the completion of transferring data signals to the pixels 728 in row 0, the pixels 728 in row 0 emit light when the emission line control signal EM_ROW0 is in a high state during subframe 1 and subframe 2.

During the subsequent subframes of the frame, display device 600 iteratively samples data signals, transfers the data signals, and emits light based on the data signals from the corresponding row of pixels 728. The display device 600 scans vertically from top to bottom until all n rows of pixels 728 emit light and repeats the process for a next frame.

Figure 11:
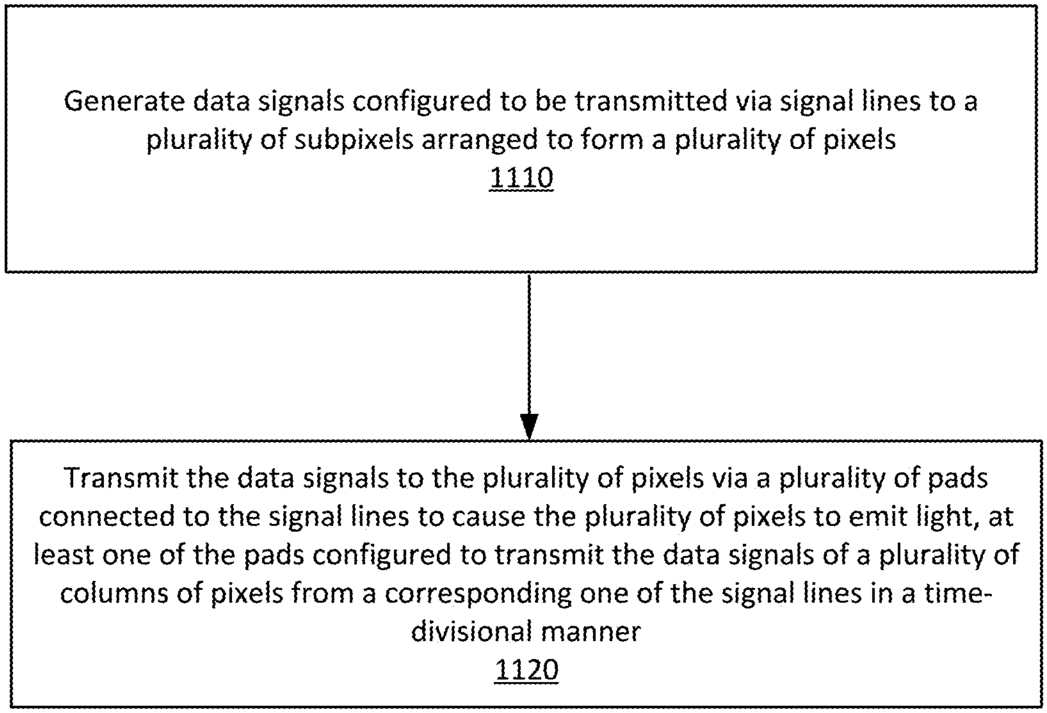
FIG. 11 is a flowchart illustrating an operation of an OLED display device according to some embodiments.

FIG. 11 is a flowchart illustrating an operation of an OLED display device according to some embodiments. An OLED display device generates 1110 data signals configured to be transmitted via signal lines to a plurality of subpixels arranged to form a plurality of pixels. The OLED display device may include a display driver circuit and a display element including a plurality of pixels. The display driver circuit may generate the data signals and transmits the data signals via the signal lines to the display element that is connected to the display driver circuit. The OLED display device transmits 1120 the data signals to the plurality of pixels via a plurality of pads connected to the signal lines to cause the plurality of pixels to emit light. The pads are disposed on the display element, and at least one of the pads may be configured to transmit the data signals of a plurality of columns of pixels from a corresponding one of the signal lines in a time-divisional manner.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device comprising:

a display driver circuit configured to generate data signals, the display driver circuit comprising a plurality of signal lines configured to transmit the data signals; and a display element connected to the display driver circuit, the display element comprising:

a plurality of pixels, each of the pixels comprising a plurality of subpixels configured to emit light according to the data signals;

a plurality of bonding pads connected to the signal lines, at least one of the bonding pads configured to transmit the data signals of a plurality columns of the pixels from a corresponding one of the signal lines in a time-divisional manner;

a first source driver configured to drive a first column of pixels;

a second source driver configured to drive a second column of pixels;

a first set of sample and hold circuits connected in parallel between the first source driver and a first bonding pad of the at least one of the pads, the first set of sample and hold circuits configured to sample data signals of the first column of pixels transmitted via the first bonding pad and store the sampled data signals of the first column of pixels for transmitting to the first source driver; and a second set of sample and hold circuits connected in parallel between the second source driver and a second bonding pad of the at least one of the bonding pads, the second set of sample and hold circuits configured to sample data signals of the second column of pixels transmitted via the second bonding pad and store the sampled data signals of the second column of pixels for transmitting to the second source driver.

2. The display device of claim 1, wherein the first set of sample and hold circuits comprises:

a first capacitor configured to store data signals of a first column of subpixels of the first column of pixels;

a first switch between the first bonding pad and the first capacitor to connect or disconnect the first capacitor to store the data signals of the first column of subpixels of the first column of pixels;

a second switch between the first capacitor and the first source driver to connect or disconnect the first capacitor and the first source driver;

a second capacitor configured to store data signals of a second column of subpixels of the first column of pixels;

a third switch between the first bonding pad and the second capacitor to connect or disconnect the second capacitor to store the data signals of the second column of subpixels of the first column of pixels; and a fourth switch between the second capacitor and the first source driver to connect or disconnect the second capacitor and the first source driver.

3. The display device of claim 2, wherein no more than one of the first switch and the third switch is closed at a time, and wherein no more than one of the second switch and the fourth switch is closed at a time.

4. The display device of claim 2, wherein a period during which one of the first switch and the third switch is closed at least partially overlaps with a period during which one of the second switch and the fourth switch is closed.

5. The display device of claim 2, wherein the first set of sample and hold circuits is connected to a first reference switch configured to connect the first source driver to a reference voltage, wherein the first reference switch is closed when the second switch and the fourth switch are open.

6. The display device of claim 2, wherein the first column of subpixels and the second column of subpixels are connected to the first source driver through a first demultiplexer configured to receive the data signals and output the data signals to the first column of subpixels when the second switch is closed and output to the sampled data signals to the second column of subpixels when the fourth switch is closed.

7. The display device of claim 2, wherein the second set of sample and hold circuits comprises:

a third capacitor configured to store data signals of a first column of subpixels of the second column of pixels;

a fifth switch between the second bonding pad and the third capacitor to connect or disconnect the third capacitor to store the data signals of the first column of subpixels of the second column of pixels;

a sixth switch between the third capacitor and the second source driver to connect or disconnect the third capacitor and the second source drive;

a fourth capacitor configured to store data signals of a second column of subpixels of the second column of pixels' a seventh switch between the second bonding pad and the fourth capacitor to connect or disconnect the fourth capacitor to store the data signals of the second column of subpixels of the second column of pixels; and an eighth switch between the fourth capacitor and the second source driver to connect or disconnect the fourth capacitor and the second source driver.

8. The display device of claim 7, wherein the second set of sample and hold circuits is connected to a second reference switch configured to connect the second source driver to a reference voltage, wherein the second reference switch is closed when the sixth switch and the eighth switch are open.

9. The display device of claim 7, wherein the first column of subpixels in the column of pixels and the first column of subpixels in the second column of pixels are configured to emit light of a first color, and wherein the second column of subpixels in the first column of pixels and the second column of subpixels in the second column of pixels emit light of a second color different from the first color.

10. The display device of claim 9, wherein the second switch and the sixth switch are configured to close at a same time, and the fourth switch and the eighth switch are configured to close at a same time.

11. The display device of claim 1, wherein pixels in a same row are configured to emit light at a same time.

12. A method comprising:

generating data signals configured to be transmitted via signal lines to a plurality of pixels, each of the pixels comprising a plurality of subpixels; and transmitting the data signals to the plurality of pixels via a plurality of bonding pads connected to the signal lines to cause the plurality of pixels to emit light, at least one of the bonding pads configured to transmit the data signals of a plurality of columns of the pixels from a corresponding one of the signal lines in a time-divisional manner, wherein the data signals are transmitted to a first set of sample and hold circuits connected in parallel between a first source driver and a first bonding pad of the at least one of the pads, the first set of sample and hold circuits configured to sample data signals of a first column of pixels transmitted via the first bonding pad and store the sampled data signals of the first column of pixels for transmitting to the first source driver, and wherein the data signals are transmitted to a second set of sample and hold circuits connected in parallel between a second source driver and a second bonding pad of the at least one of the pads, the second set of sample and hold circuits configured to sample data signals of a second column of pixels transmitted via the second bonding pad and store the sampled data signals of the second column of pixels for transmitting to the second source driver.

13. The method of claim 12, further comprising:

causing a first switch between the first bonding pad and a first capacitor to connect or disconnect the first capacitor to store the data signals of a first column of subpixels of the first column of pixels;

causing a second switch between the first capacitor and the first source driver to connect or disconnect the first capacitor and the first source driver;

causing a third switch between the first bonding pad and a second capacitor to connect or disconnect the second capacitor to store the data signals of a second column of subpixels of the first column of pixels; and causing a fourth switch between the second capacitor and the first source driver to connect or disconnect the second capacitor and the first source driver.

14. The method of claim 13, wherein no more than one of the first switch and the third switch is closed at a time, and wherein no more than one of the second switch and the fourth switch is closed at a time.

15. The method of claim 13, wherein a period during which one of the first switch and the third switch is closed at least partially overlaps with a period during which one of the second switch and the fourth switch is closed.

16. The method of claim 13, wherein the first column of subpixels and the second column of subpixels in the first column of pixels are connected to the first source driver through a first demultiplexer configured to receive the data signals and output the data signals to the first column of subpixels when the second switch is closed and output to the sampled data signals to the second column of subpixels when the fourth switch is closed.

17. An electronic device comprising:

a display driver circuit configured to generate data signals, the display driver circuit comprising a plurality of signal lines configured to transmit the data signals; and a display element connected to the display driver circuit, the display element comprising:

a plurality of pixels, each of the pixels comprising a plurality of subpixels configured to emit light according to the data signals;

a plurality of bonding pads connected to the signal lines, at least one of the bonding pads configured to transmit the data signals of a plurality columns of the pixels from a corresponding one of the signal lines in a time-divisional manner;

a first source driver configured to drive a first column of pixels;

a second source driver configured to drive a second column of pixels;

a first set of sample and hold circuits connected in parallel between the first source driver and a first bonding pad of the at least one of the pads, the first set of sample and hold circuits configured to sample data signals of the first column of pixels transmitted via the first bonding pad and store the sampled data signals of the first column of pixels for transmitting to the first source driver; and a second set of sample and hold circuits connected in parallel between the second source driver and a second bonding pad of the at least one of the bonding pads, the second set of sample and hold circuits configured to sample data signals of the second column of pixels transmitted via the second bonding pad and store the sampled data signals of the second column of pixels for transmitting to the second source driver.

18. The electronic device of claim 17, wherein the electronic device is a head-mounted display (HMD).

* * * * *